United States Patent
Ogata et al.

(10) Patent No.: US 9,291,448 B2
(45) Date of Patent: Mar. 22, 2016

(54) DETECTION DEVICE AND IMAGE FORMING APPARATUS

(71) Applicant: FUJI XEROX CO., LTD., Tokyo (JP)

(72) Inventors: Kenta Ogata, Kanagawa (JP); Naoya Yamasaki, Kanagawa (JP); Gen Nakajima, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 36 days.

(21) Appl. No.: 13/727,349

(22) Filed: Dec. 26, 2012

(65) Prior Publication Data

US 2014/0093261 A1 Apr. 3, 2014

(30) Foreign Application Priority Data

Sep. 28, 2012 (JP) ................................ 2012-216803

(51) Int. Cl.
*G03G 15/00* (2006.01)
*G01B 11/14* (2006.01)
*G03C 5/02* (2006.01)

(52) U.S. Cl.
CPC *G01B 11/14* (2013.01); *G03C 5/02* (2013.01); *G03G 15/5041* (2013.01); *G03G 15/556* (2013.01)

(58) Field of Classification Search
CPC .......... G03G 15/5054; G03G 15/5058; G03G 15/50; G03G 15/5033; G03G 15/0435; G02B 5/001; G02B 3/10
USPC ........................ 399/49, 74, 218; 356/614, 624
See application file for complete search history.

(56) References Cited

U.S. PATENT DOCUMENTS

| 2002/0051648 | A1 | 5/2002 | Shimomura et al. |
| 2002/0085250 | A1* | 7/2002 | Kim et al. ................... 359/22 |
| 2004/0251435 | A1 | 12/2004 | Sawayama et al. |
| 2005/0259266 | A1* | 11/2005 | Seko ........................ 356/498 |

(Continued)

FOREIGN PATENT DOCUMENTS

| JP | A-2002-55572 | 2/2002 |
| JP | A-2002-162803 | 6/2002 |

(Continued)

OTHER PUBLICATIONS

D. Zeng, W. P. Latham, A. Kar, "Shaping of annular laser intensity profiles and their thermal effects for optical trepanning", Optical Engineering 45(1) Jan. 2006.*

(Continued)

*Primary Examiner* — Clayton E Laballe
*Assistant Examiner* — Ruifeng Pu
(74) *Attorney, Agent, or Firm* — Oliff PLC

(57) ABSTRACT

A detection device includes an irradiation unit that irradiates a medium with first irradiation light, a first optical system that has a first incident surface and changes the first irradiation light into second irradiation light, a second optical system that has a second incident surface and changes the first irradiation light into third irradiation light, and a light receiving unit that is provided in a traveling direction of reflection light of the second irradiation light and the third irradiation light, which are specularly reflected by the medium, and receives the reflection light of the second irradiation light and the third irradiation light, which are specularly reflected by the medium, so as to detect a positional deviation amount of an image formed on the medium and detect a density deviation amount of the image formed on the medium.

1 Claim, 9 Drawing Sheets

(56) References Cited

U.S. PATENT DOCUMENTS

2008/0170220 A1     7/2008    Sawayama et al.
2011/0280605 A1*   11/2011   Kishi .............................. 399/49

FOREIGN PATENT DOCUMENTS

| JP | A-2007-47432 | 2/2007 |
| JP | B2-4154272 | 9/2008 |
| JP | 2010-181214 A | 8/2010 |
| JP | A-2011-107524 | 6/2011 |

OTHER PUBLICATIONS

Eskema Product Pamphlet.*
Kizuka, Y., Yamauchi, M. Characteristics of a laser beam spot focused by a binary diffractive axicon. Optical Engineering 47(5), May 2008.*
Examiner annotation of Figure 4.*
Nov. 24, 2015 Office Action issued in Japanese Patent Application No. 2012-216803.

* cited by examiner

DETECTION DEVICE AND IMAGE FORMING APPARATUS

CROSS-REFERENCE TO RELATED APPLICATIONS

This application is based on and claims priority under 35 USC 119 from Japanese Patent Application No. 2012-216803 filed Sep. 28, 2012.

BACKGROUND

Technical Field

The present invention relates to a detection device and an image forming apparatus.

SUMMARY

According to an aspect of the invention, there is provided a detection device including: an irradiation unit that irradiates a medium with first irradiation light; a first optical system that has a first incident surface, which is substantially annular and onto which the first irradiation light is incident, and changes the first irradiation light, which is incident from the corresponding first incident surface, into second irradiation light of which a diameter formed when the light arrives at the medium is less than or equal to a diameter formed when the light is incident onto the first incident surface; a second optical system that has a second incident surface, which is surrounded by the first incident surface and onto which the first irradiation light is incident, and changes the first irradiation light, which is incident from the corresponding second incident surface, into third irradiation light of which a diameter formed when the light arrives at the medium is less than a diameter formed when the light is incident onto the second incident surface; and a light receiving unit that is provided in a traveling direction of reflection light of the second irradiation light and the third irradiation light, which are specularly reflected by the medium, and receives the reflection light of the second irradiation light and the third irradiation light, which are specularly reflected by the medium, so as to detect a positional deviation amount of an image formed on the medium and detect a density deviation amount of the image formed on the medium.

BRIEF DESCRIPTION OF THE DRAWINGS

Exemplary embodiments of the present invention will be described in detail based on the following figures, wherein.

DETAILED DESCRIPTION

Figure 1:
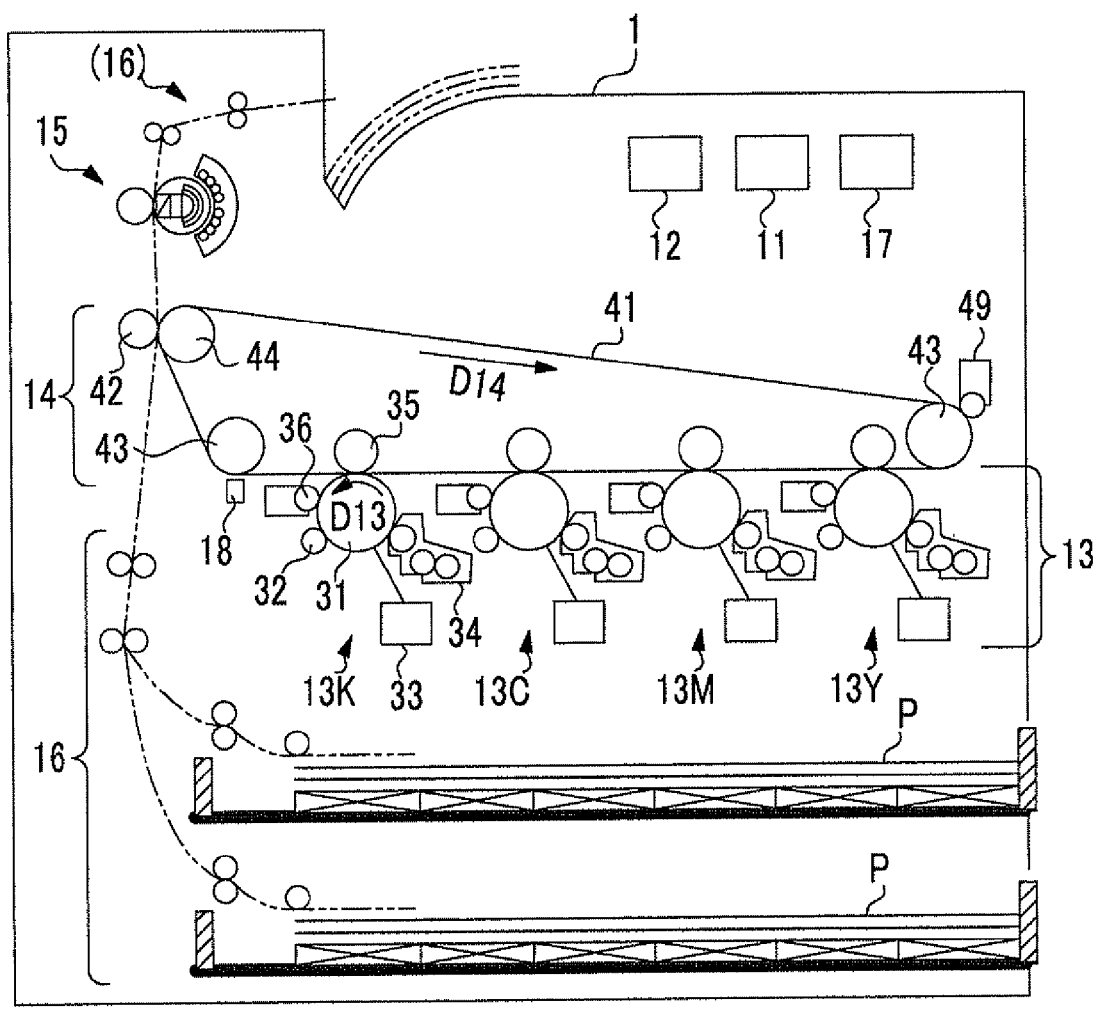
FIG. 1 is a diagram illustrating an overall configuration of an image forming apparatus according to a first exemplary embodiment.

1. First Exemplary Embodiment 1-1. Overall Configuration of Image Forming Apparatus FIG. 1 is a diagram illustrating an overall configuration of an image forming apparatus 1 according to a first exemplary embodiment. As shown in the drawing, the image forming apparatus 1 includes a controller 11, a memory 12, developing units 13Y, 13M, 13C, and 13K, a transfer unit 14, a heating unit 15, a transport unit 16, an operation unit 17, and a detection unit 18. It should be noted that the reference signs Y, M, C, and K are respectively defined as components corresponding to yellow, magenta, cyan, and black toners. The respective developing units 13Y, 13M, 13C, and 13K have no difference other than toners used therefor. Hereinafter, in a case where it is not necessary to particularly distinguish the respective developing units 13Y, 13M, 13C, and 13K, the alphabets attached to the ends of the reference numerals representing the colors of the toners are omitted, and the developing units are referred to as "a developing unit 13".

The controller 11 has a CPU (Central Processing Unit), a ROM (Read Only Memory), and a RAM (Random Access Memory), and controls the respective units of the image forming apparatus 1 in a way that the CPU reads and executes a computer program (hereinafter simply referred to as a program) which is stored in the ROM or the memory 12.

The operation unit 17 has operational members such as an operation button for issuing various instructions, and receives user's operation and supplies a signal corresponding to the contents of the operation to the controller 11. The memory 12 is a high-capacity storage unit such as a hard disk drive, and stores a program which is read by the CPU of the controller 11. Further, the memory 12 stores not only various kinds of data such as image data, which represents an image formed on a medium, but also image data, which represents an image (referred to as a position reference image) for detecting a positional deviation, and image data, which represents an image (referred to as a density reference image) for detecting a density deviation. The positional deviation is a difference (deviation) between a position (referred to as a target position), at which an image will be formed, and a position at which the image is actually formed, and the amount indicating the difference is referred to as a positional deviation amount. The density deviation is a difference between a target value (referred to as a target density) of an optical density of an image to be formed and an optical density of an image which is actually formed, and the amount indicating the difference is referred to as a density deviation amount.

The transport unit 16 has a container and a transport roller. The container contains sheets of paper P as media each of which is cut to have a predetermined size. The sheets of paper P, contained in the container, are unloaded one by one by the transport roller in response to the instruction of the controller 11, and are transported to the transfer unit 14 through the sheet transport path. It should be noted that the media are not limited to the sheets of paper, for example, may be resin sheets or the like. In short, it is preferable that the medium be a medium having a surface on which an image can be recorded.

Each developing unit 13 includes a photoconductor drum 31, a charger 32, an exposure device 33, a developer unit 34, a primary transfer roller 35, and a drum cleaner 36. The photoconductor drum 31 is an image holding member which has a charge generation layer or a charge transport layer, and is rotated in a direction of the arrow D13 in the drawing by a driving unit which is not shown. The charger 32 charges the surface of the photoconductor drum 31. The exposure device 33 has a laser light emitting source, a polygon mirror, and the like (any one is not shown in the drawing), and irradiates the photoconductor drum 31, which is charged by the charger 32, with laser light corresponding to the image data, under the control of the controller 11. Thereby, each photoconductor drum 31 holds a latent image. It should be noted that the image data may be acquired by the controller 11 from an external device through a communication unit which is not shown. The external device is, for example, a reading device that reads an original image, a storage device that stores data representing an image, or the like.

The developer unit 34 contains a developer including a toner with any one color of Y, M, C, and K. Such a toner supplied from the developer unit 34 is adhered onto a portion, which is exposed by the exposure device 33, on the surface of the photoconductor drum 31, that is, the image line portion of the electrostatic latent image, thereby forming (developing) an image on the photoconductor drum 31.

The primary transfer roller 35 causes a predetermined difference in electric potential at a position where the intermediate transfer belt 41 of the transfer unit 14 is opposed to the photoconductor drum 31, thereby transferring the image onto the intermediate transfer belt 41 due to the difference in electric potential. The drum cleaner 36 removes a non-transferred toner which remains on the surface of the photoconductor drum 31 after the transfer of the image, thereby removing charges on the surface of the photoconductor drum 31.

The transfer unit 14 includes an intermediate transfer belt 41, a secondary transfer roller 42, a belt transport roller 43, and a backup roller 44, and is a transfer unit that transfers the image, which is formed by the developing unit 13, onto the sheet of paper P of the paper type determined by user's operation.

The intermediate transfer belt 41 is a medium (transfer medium) having a surface onto which the image is transferred. The intermediate transfer belt 41 is an endless belt member, and the shape thereof is substantially annular. The intermediate transfer belt 41 is stretched by the belt transport roller 43 and the backup roller 44. At least one of the belt transport roller 43 and the backup roller 44 may have a driving unit (not shown in the drawing), thereby moving the intermediate transfer belt 41 in a direction of the arrow D14 of the drawing. That is, the intermediate transfer belt 41 is moved in the direction of the arrow D14 which is a circumferential direction of the substantially annular shape. The intermediate transfer belt 41, which is moved in the direction of the arrow D14, passes through the position at which the belt is opposed to the detection unit 18.

It should be noted that the belt transport roller 43 or the backup roller 44, which does not have the driving unit, is rotated by following the movement of the intermediate transfer belt 41. By moving and rotating the intermediate transfer belt 41 in the direction of the arrow D14 shown in the drawing, the image on the intermediate transfer belt 41 is moved to an area between the secondary transfer roller 42 and the backup roller 44.

The secondary transfer roller 42 transfers the image on the intermediate transfer belt 41 onto the sheet of paper P, which is transported from the transport unit 16, due to the difference in electric potential between the roller and the intermediate transfer belt 41. The belt cleaner 49 removes the non-transferred toner which remains on the surface of the intermediate transfer belt 41. Then, the transfer unit 14 or the transport unit 16 transports the sheet of paper P, onto which the image is transferred, to the heating unit 15. It should be noted that the developing unit 13 and the transfer unit 14 are examples of image forming units each of which forms an image on a medium in the exemplary embodiments of the invention. The heating unit 15 heats and melts the toner, thereby fixing the image which is transferred onto the sheet of paper P. The sheet of paper P, onto which the image is fixed through the heating unit 15, is transported to a paper tray, which is provided outside the casing of the image forming apparatus 1, by the transport unit 16.

The detection unit 18 irradiates the density reference image or the position reference image, which is formed on the intermediate transfer belt 41, with the light, and receives the reflection light, thereby specifying the density deviation amount or the positional deviation amount on the basis of the received light. The detection unit 18 is downstream of the four developing units 13, and the intermediate transfer belt 41 is disposed to be opposed to the intermediate transfer belt 41 upstream of the area between the secondary transfer roller 42 and the backup roller 44.

1-2. Configuration Of Detection Unit

Figure 2:
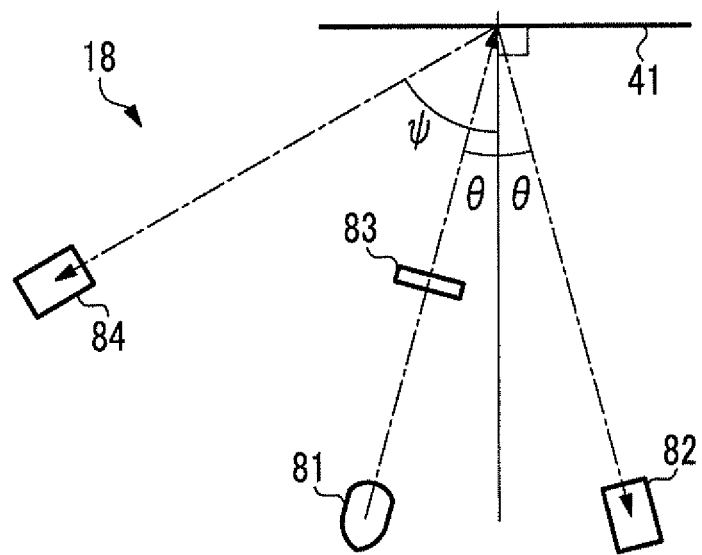
FIG. 2 is a diagram illustrating arrangement of components of a detection unit according to the first exemplary embodiment.

FIG. 2 is a diagram illustrating arrangement of components of a detection unit 18 according to the first exemplary embodiment. The detection unit 18 includes an irradiation unit 81, a light receiving unit 82, an optical system 83, and a diffuse reflection light receiving unit 84. The irradiation unit 81 irradiates the intermediate transfer belt 41 with the irradiation light. At this time, the angle of incidence of the irradiation light to the intermediate transfer belt 41 is set as θ. The irradiation unit 81 is, for example, an LED (Light Emitting Diode). The optical system 83 is provided in the range from the irradiation unit 81 to the intermediate transfer belt 41, and receives first irradiation light and adjusts the traveling direction of the light included in the first irradiation light.

The diffuse reflection light receiving unit 84 receives diffuse reflection light which is diffusely reflected by the intermediate transfer belt 41 through the optical system 83, detects the density deviation amount of the image, which is formed by the toner with a color other than black, among the images formed on the intermediate transfer belt 41. The angle of reflection of the diffuse reflection light on the intermediate transfer belt 41 is, for example, ψ as shown in FIG. 2, contrary to the angle of incidence mentioned above.

The light receiving unit 82 receives the reflection light which is specularly reflected by the intermediate transfer belt 41 through the optical system 83, thereby detecting each of the positional deviation amount and the density deviation amount of the image, which is formed on the intermediate transfer belt 41. The reflection light is specular reflection light, and thus as shown in FIG. 2, the angle of reflection on the intermediate transfer belt 41 is set as θ like the angle of incidence mentioned above. That is, the light receiving unit 82 doubles as a detection unit that detects the positional deviation amount and a detection unit that detects the density deviation amount. Both the diffuse reflection light receiving unit 84 and the light receiving unit 82 are optical elements that generate signals corresponding to the received light, and are, for example, photo diodes (PD; Photodiode).

It should be noted that, when the light receiving unit 82 detects the positional deviation amount, for example, a position reference image, in which a chevron shape (so-called chevron pattern) tilted to the movement direction of the intermediate transfer belt 41 is drawn, is formed on the surface of the intermediate transfer belt 41 by the toners with the respective colors supplied from the developing unit 13. That is, the positional deviation amount is detected in the MOB (Marks On Belt) method of detecting the position reference image which is formed on the surface of the intermediate transfer belt 41, and the controller 11 of the image forming apparatus 1 adjusts the position of the electrostatic latent image which is exposed by the exposure device 33 on the surface of the photoconductor drum 31 on the basis of the detected positional deviation amount, thereby controlling the developing unit 13.

Further, when the light receiving unit 82 detects the density deviation amount, for example, the controller 11 of the image forming apparatus 1 causes the charger 32 to uniformly charge the photoconductor drum 31 at the determined electric potential. Then, the controller 11 causes the exposure device 33 to create a so-called density reference patch of an electric potential as a reference on the basis of the image data which is read from the memory 12, causes the developer unit 34 to develop the density reference patch, and causes the detection unit 18 to detect the optical density. The density reference image, which is formed on the surface of the intermediate transfer belt 41 by developing the density reference patch, is formed by for example a toner with which the inside of the rectangle of which one side has a size of 20 mm (millimeter) is filed at the reference density.

In the development at that time, the developing unit 13K is used, and thus other developing units 13 are not used. That is, the density reference image is formed by the black toner. The reason is that the light receiving unit 82 is disposed in a direction, in which the irradiation light is specularly reflected by the intermediate transfer belt 41, in order to double as the detection unit that detects the positional deviation amount. All the images, which are formed by the yellow, magenta, and cyan toners, belong to the so-called diffuse optical system in which the intensity of the diffused light increases as the density thereof increases, and thus it is difficult for the density thereof to be changed at the intensity of the specular reflection light. Hence, the density deviation amount of the image, which is formed by the toners other than the black toner, is detected by the diffuse reflection light receiving unit 84 that receives the diffuse reflection light.

In contrast, the black toner belongs to the so-called specular reflection optical system in which the intensity of the specular reflection light decreases as the density increases. Consequently, in order to detect the positional deviation amount of the image formed by the black toner, the light receiving unit 82, which is disposed in a direction in which the irradiation light is specularly reflected by the intermediate transfer belt 41, is also used in detecting the density deviation amount.

The density deviation amount, which is detected by the light receiving unit 82, is used in the automatic density control of the controller 11, and the optical density of the formed image is adjusted. The controller 11 controls parameters, which determines the image density, such as the density of the toner in the developer, the development bias, the exposure amount, and the charge amount on the basis of the detection result.

Figure 3:
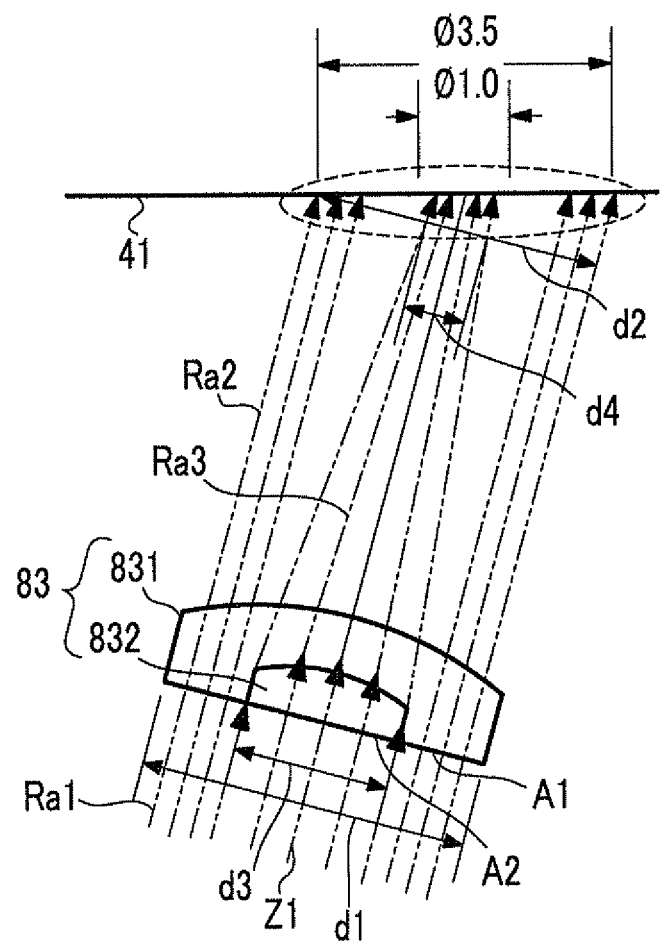
FIG. 3 is a diagram illustrating a configuration of an optical system according to the first exemplary embodiment.

FIG. 3 is a diagram illustrating a configuration of the optical system 83 according to the first exemplary embodiment. The optical system 83 is components, which changes the optical path, such as the lens, the prism, and the aperture, and a combination of the components thereof, and is a lens including lenses in the example shown in FIG. 3. The optical system 83 includes a first optical system 831 and a second optical system 832. The second optical system 832 is provided in the first optical system 831.

The first optical system 831 has a first incident surface A1 which is substantially annular and onto which the irradiation light (hereinafter referred to as first irradiation light Ra1) emitted by the irradiation unit 81 is incident. Specifically, the first incident surface A1 has a substantially circular ring shape which is formed between the circle, which has the diameter d1, and the circle which is a substantially concentric circle inside the circle and has the diameter d3. In addition, the first optical system 831 changes the optical path of the first irradiation light Ra1 which is incident from the first incident surface A1, and irradiates the intermediate transfer belt 41 with second irradiation light Ra2 which is substantially annular. Here, when the center line Z1 passing the center point of the first incident surface A1 is defined as the center of the diameter of the rays, the diameter d2, which is formed when the second irradiation light Ra2 arrives at the intermediate transfer belt 41, is less than or equal to the diameter d1 which is formed when the light is incident onto the first incident surface A1. It should be noted that the diameter d2 may be less than or equal to the diameter d1 and thus may be equal to the diameter d1. When the diameter d2 is equal to the diameter d1, the second irradiation light Ra2 is parallel light. That is, in this case, the first optical system 831 changes the first irradiation light Ra1, which is diffused light, into the second irradiation light Ra2 which is parallel light.

The second optical system 832 is provided inside the first optical system 831 as described above. The second optical system 832 has a second incident surface A2 which is surrounded by the first incident surface A1 having an annular shape and onto which the first irradiation light Ra1 is incident. The second incident surface A2 has a shape of which the outer periphery is the circle of the diameter d3 mentioned above. In addition, the second optical system 832 changes the optical path of the first irradiation light Ra1 which is incident from the second incident surface A2, and irradiates the intermediate transfer belt 41 with the third irradiation light Ra3. The diameter d4, which is formed when the third irradiation light Ra3 arrives at the intermediate transfer belt 41, is less than the diameter d3 which is formed when the light is incident onto the second incident surface A2. Thereby, the second irradiation light Ra2, which is substantially annular, and the third irradiation light Ra3, which is concentrated inside the second irradiation light Ra2, arrive at the intermediate transfer belt 41 as shown in FIG. 3. The region of the second irradiation light Ra2 reaching the surface of the intermediate transfer belt 41 is, for example, an ellipse with the long diameter of about 3.5 mm. In contrast, the region of the above-mentioned third irradiation light Ra3 reaching the surface of the intermediate transfer belt 41 is, for example, an ellipse with the long diameter of about 1.0 mm.

The light receiving unit 82 is provided in the traveling direction of the reflection light of the second irradiation light Ra2, which is substantially annular, and the third irradiation light Ra3, which is concentrated inside the second irradiation light Ra2, specularly reflected by the intermediate transfer belt 41. The light receiving unit 82 receives the reflection light, and detects each of the positional deviation amount and the density deviation amount of the image formed on the intermediate transfer belt 41, as described above.

1-3. Projected Light Profile

Figure 4:
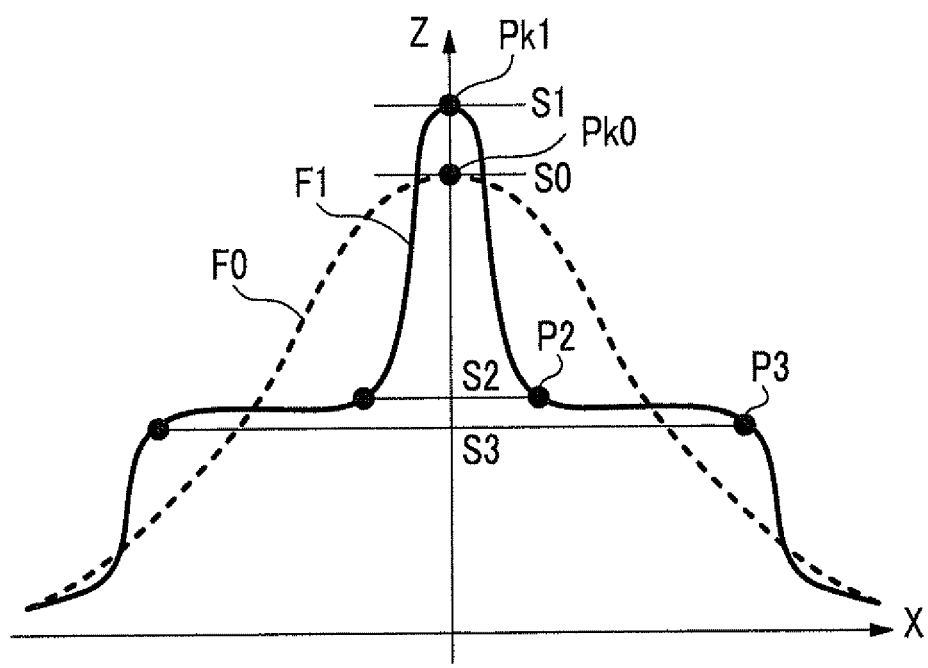
FIG. 4 is a diagram illustrating an example of a projected light profile of light which arrives at an intermediate transfer belt.

FIG. 4 is a diagram illustrating an example of a projected light profile of the light which arrives at the intermediate transfer belt 41 through the optical system 83. The projected light profile is a graph that shows the light intensity which arrives at each position. The horizontal axis x of FIG. 4 indicates a certain direction along the surface of the intermediate transfer belt 41. The vertical axis z of FIG. 4 indicates the intensity of the irradiation light which arrives at each of the positions arranged in the above-mentioned direction. In the projected light profile shown in FIG. 4, distribution of the light intensity in the above-mentioned direction on the surface of the intermediate transfer belt 41 can be seen, but distribution of the light intensity in a different direction along the surface is not clear. However, the vertical axis z shown in FIG. 4 passes through the peak value of the light intensity in the projected light profile. In addition, the projected light profile is a shape which is obtained by rotating the shape shown in FIG. 4 about the vertical axis z as the center thereof. Hence, the distribution of the light intensity in the different direction mentioned above is omitted in the drawing.

The reference profile F0 shown in FIG. 4 is a profile that represents the intensity distribution of the light which arrives at the intermediate transfer belt 41 when the optical system 83 is not present. The projected light profile F1 shown in FIG. 4 is a profile that represents the intensity distribution of the second irradiation light Ra2 and the third irradiation light Ra3 which arrive at the intermediate transfer belt 41 through the optical system 83.

In the case of the reference profile F0, the optical system 83 is not present, and thus the first irradiation light Ra1 arrives at the intermediate transfer belt 41 as it is. Therefore, the profile has a bell shape in which the peak Pk0 is present at the position which is on the vertical axis z. In the reference profile F0, the intensity is gently lowered as a position thereof on the horizontal axis x shifts from the above-mentioned peak Pk0 in any one of the positive direction and the negative direction of the axis.

In contrast, in the projected light profile F1, due to the third irradiation light Ra3 concentrated by the second optical system 832, the peak Pk1 is protruded compared with the reference profile F0. For example, in the example shown in FIG. 4, the light intensity at the peak Pk0 is S0, while the light intensity at the peak Pk1 is S1 higher than S0.

In addition, the projected light profile F1 passes through the point of inflection P2 at a position slightly apart from the peak Pk1 (that is, the vertical axis z). The light intensity at the point of inflection 22 is S2 lower than S0. The light intensity S2 is lower than the light intensity on the reference profile F0 at the same position since the point of inflection 22 is out of the range of the concentrated third irradiation light Ra3 mentioned above. At a position farther from the vertical axis z than the point of inflection 22, the projected light profile F1 passes through the point of inflection 23. The light intensity at the point of inflection 23 is higher than the light intensity on the reference profile F0 at the same position since the first irradiation light Ra1 is changed into the second irradiation light Ra2, which is inhibited from being diffused, by the first optical system 831. In addition, the light intensity at the point of inflection P3 is S3 slightly lower than 32. Here, the intensity difference between S2 and S3 is smaller than the intensity difference between S1 and S2. Accordingly, the change in the light intensity in the range from the point of inflection P2 to the point of inflection 23 on the horizontal axis x is less than the change in the light intensity in the range from the peak Pk1 to the point of inflection P2. In addition, the light intensity is drastically lowered as the position thereof becomes farther from the vertical axis z than the point of inflection P3.

As described above, the first irradiation light Ra1 is changed into the second irradiation light Ra2, which is substantially annular, and the third irradiation light Ra3, which is concentrated inside the second irradiation light Ra2, through the optical system 83, whereby it is possible to obtain, for example, the projected light profile F1 shown in FIG. 4. In the projected light profile F1, the peak at the center position is more precipitous than that in the reference profile F0. Consequently, when the detection unit 18 detects the positional deviation amount, the rays received by the light receiving unit 82 is stopped, compared with the case where the optical system 83 is not present, and thus the positional accuracy is improved.

In contrast, the projected light profile F1 indicates that the light, which arrives in the range from the point of inflection P2 to the point of inflection P3 present on both sides with the center position interposed therebetween, keeps the intensity uniform at a certain degree, compared with the case where the optical system 83 is not provided. The reflection light, which is reflected in this range, is generated in response to the incidence of the irradiation light of which the intensity is uniform compared with the case where the optical system 83 is not provided, and thus contributes to the detection of the density deviation amount. That is, for example, as the toner density increases, only the reflection light, which is reflected in the range from the center position to the point of inflection P2, is unlikely to cause the power difference. However, in addition thereto, the reflection light, which is reflected in the range from the point of inflection P2 to the point of inflection P3, arrives at the light receiving unit 82, and thus tends to cause the power difference even in the high density area. As a result, the accuracy in the density detected by the detection unit 18 is improved.

2. Second Exemplary Embodiment

Figure 5:
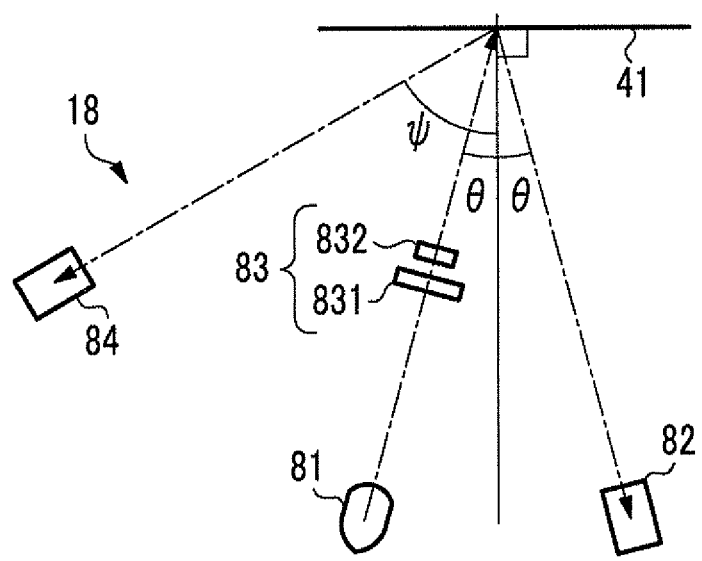
FIG. 5 is a diagram illustrating arrangement of components of a detection unit according to a second exemplary embodiment.

FIG. 5 is a diagram illustrating arrangement of the components of the detection unit 18 according to a second exemplary embodiment. The second exemplary embodiment is different from the first exemplary embodiment in that the first optical system 831 and the second optical system 832, which constitute the optical system 83 provided in the detection unit 18, are arranged at positions apart from each other.

Figure 6:
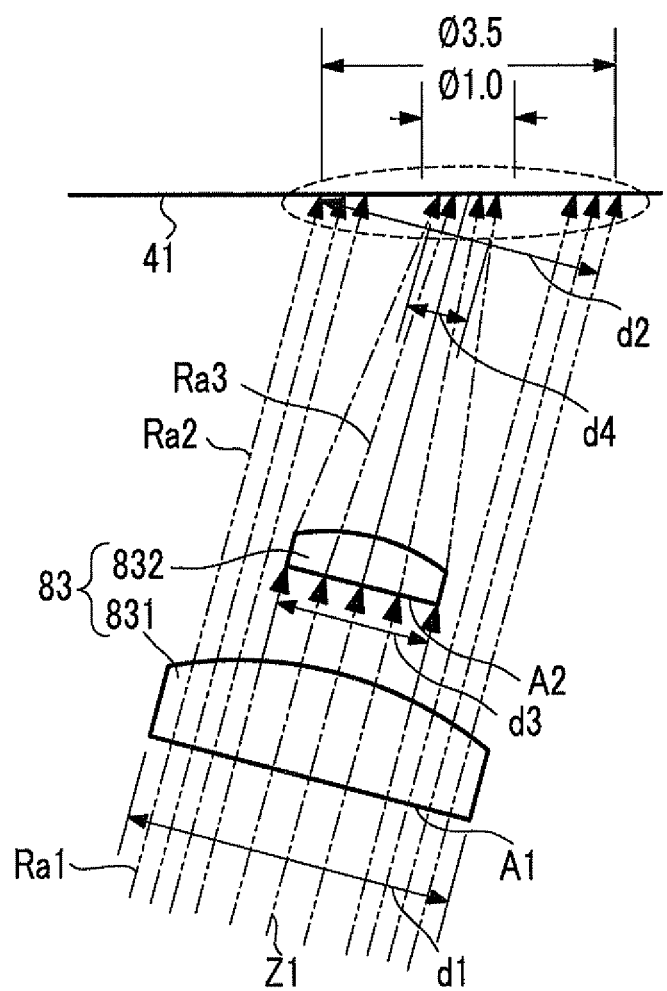
FIG. 6 is a diagram illustrating a configuration of an optical system according to the second exemplary embodiment.

FIG. 6 is a diagram illustrating a configuration of the optical system 83 according to the second exemplary embodiment. The optical system 83 includes the first optical system 831 and the second optical system 832. The second optical system 832 is provided in the range from the first optical system 831 to the intermediate transfer belt 41.

The first optical system 831 has the first incident surface A1 onto which the first irradiation light Ra1 emitted by the irradiation unit 81 is incident. In addition, the first optical system 831 changes the optical path of the first irradiation light Ra1 which is incident from the first incident surface A1, and irradiates the intermediate transfer belt 41 with second irradiation light Ra2. The diameter d2, which is formed when the second irradiation light Ra2 arrives at the intermediate transfer belt 41, is less than or equal to the diameter d1 which is formed when the light is incident onto the first incident surface A1.

The second optical system 832 is provided in the range from the first optical system 831 to the intermediate transfer belt 41 as described above. The second optical system 832 has the second incident surface A2 onto which a part of the second irradiation light Ra2 emitted from the first optical system 831 is incident. In addition, the second optical system 832 changes the light which is incident from the second incident surface A2, and irradiates the intermediate transfer belt 41 with the third irradiation light Ra3. The diameter d4, which is formed when the third irradiation light Ra3 arrives at the intermediate transfer belt 41, is less than the diameter d3 which is formed when the light is incident onto the second incident surface A2. Thereby, the second irradiation light Ra2, which is substantially annular, and the third irradiation light Ra3, which is concentrated inside the second irradiation light Ra2, arrive at the intermediate transfer belt 91 as shown in FIG. 3. The region of the second irradiation light Ra2 reaching the surface of the intermediate transfer belt 41 is, for example, an ellipse with the long diameter of about 3.5 mm. In contrast, the region of the above-mentioned third irradiation light Ra3 reaching the surface of the intermediate transfer belt 41 is, for example, an ellipse with the long diameter of about 1.0 mm.

As described above, likewise in the second exemplary embodiment, the first irradiation light Ra1 is changed into the second irradiation light Ra2, which is substantially annular, and the third irradiation light Ra3, which is concentrated inside the second irradiation light Ra2, through the optical system 83, whereby it is possible to obtain, for example, the projected light profile F1 shown in FIG. 4. Consequently, the accuracy in the position and the density detected by the detection unit 18 is improved.

3. Third Exemplary Embodiment

Figure 7:
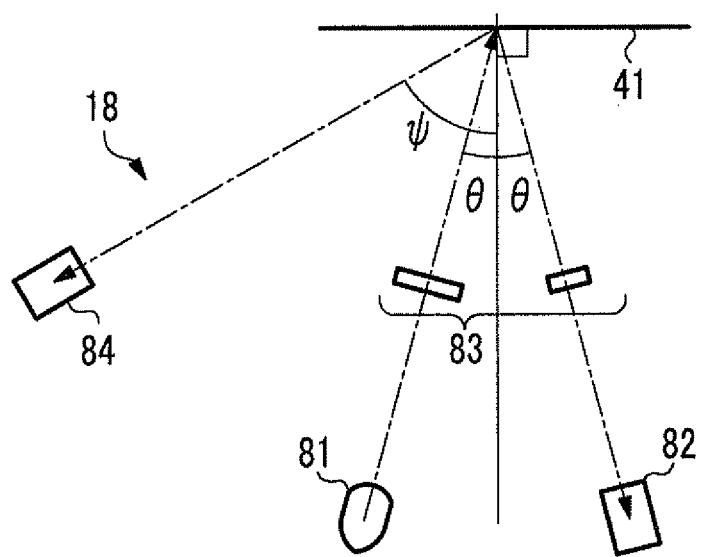
FIG. 7 is a diagram illustrating arrangement of components of a detection unit according to a third exemplary embodiment.

FIG. 7 is a diagram illustrating arrangement of components of the detection unit 18 according to a third exemplary embodiment. The third exemplary embodiment is different from the first exemplary embodiment in that the first optical system 831 and the second optical system 832, which constitute the optical system 83 provided in the detection unit 18, are arranged at positions apart from each other. Further, the third exemplary embodiment is different from the second exemplary embodiment in that the second optical system 832 is provided in the optical path of the reflection light which is specularly reflected from the intermediate transfer belt 41.

Figure 8:
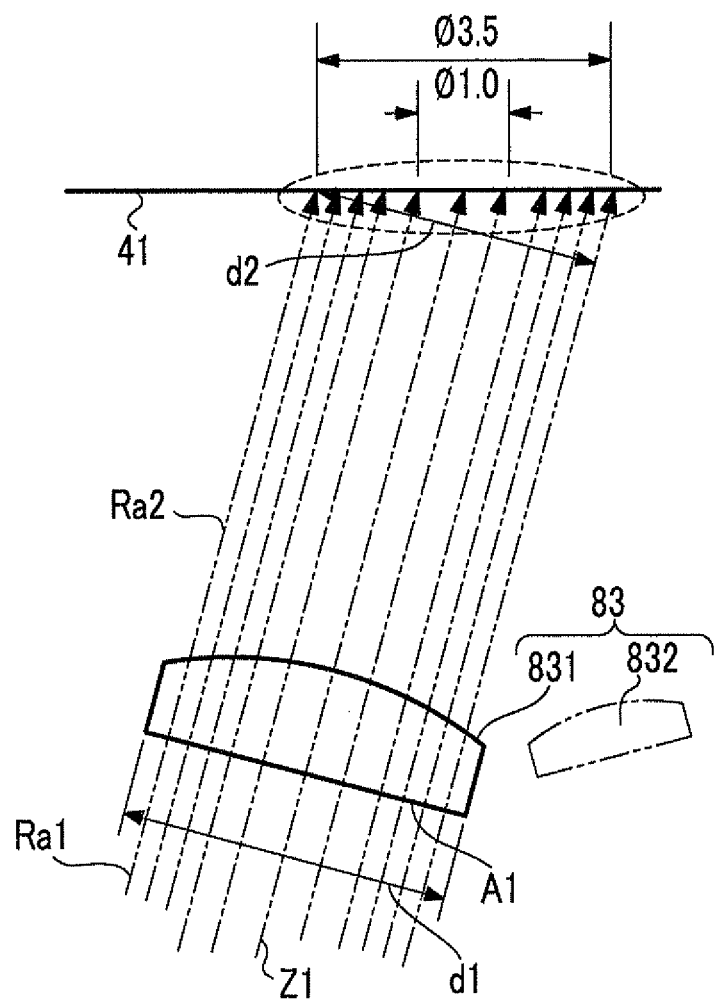
FIG. 8 is a diagram illustrating a first optical system of an optical system according to the third exemplary embodiment.
Figure 9:
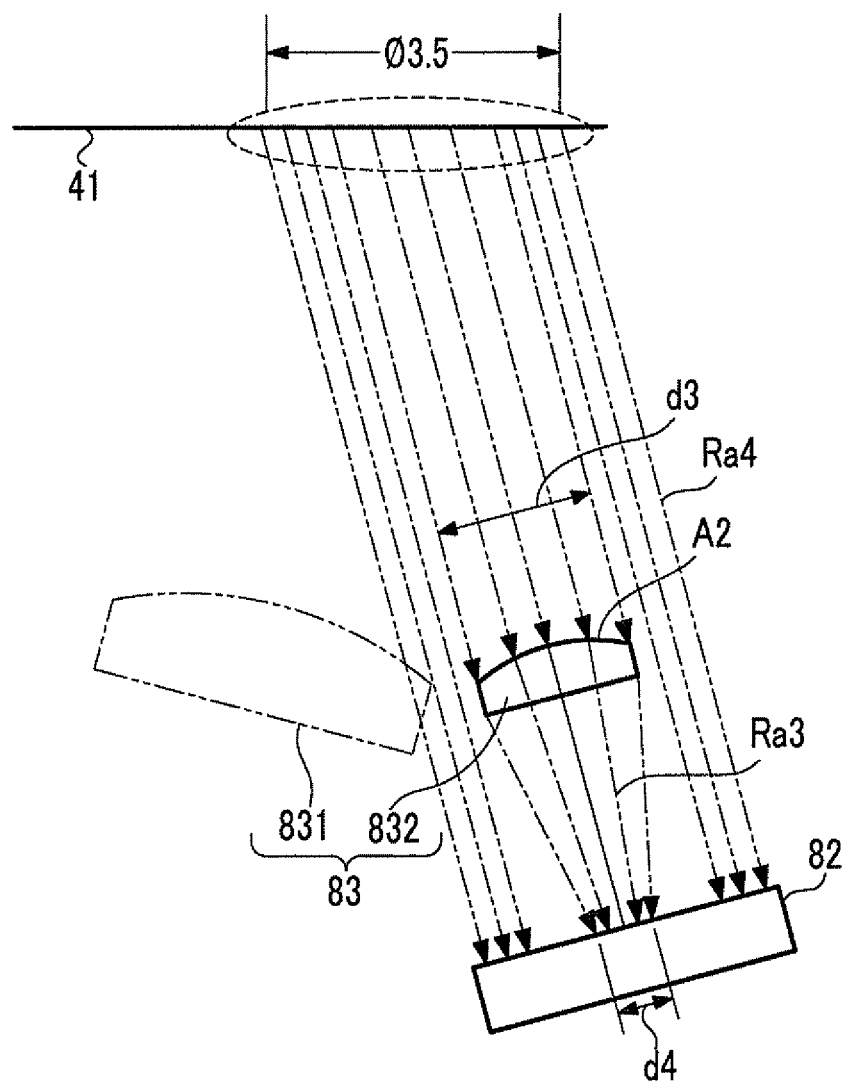
FIG. 9 is a diagram illustrating a second optical system of the optical system according to the third exemplary embodiment.

FIG. 8 is a diagram illustrating the first optical system 831 of the optical system 83 according to the third exemplary embodiment. FIG. 9 is a diagram illustrating the second optical system 832 of the optical system 83 according to the third exemplary embodiment. The optical system 83 includes the first optical system 831 and the second optical system 832. The second optical system 832 is provided in the optical path of the reflection light Ra4 of the second irradiation light Ra2 which is emitted from the first optical system 831 and specularly reflected by the intermediate transfer belt 41.

As shown in FIG. 8, the first optical system 831 has the first incident surface A1 onto which the first irradiation light Ra1 emitted by the irradiation unit 81 is incident. In addition, the first optical system 831 changes the optical path of the first irradiation light Ra1 which is incident from the first incident surface A1, and irradiates the intermediate transfer belt 41 with second irradiation light Ra2. The diameter d2, which is formed when the second irradiation light Ra2 arrives at the intermediate transfer belt 41, is less than or equal to the diameter d1 which is formed when the light is incident onto the first incident surface A1.

As shown in FIG. 9, the second optical system 832 has the second incident surface A2 onto which a part of the reflection light Rag of the second irradiation light Ra2 emitted from the first optical system 831 and specularly reflected by the intermediate transfer belt 41 is incident. In addition, the second optical system 832 concentrates the light which is incident from the second incident surface A2, and irradiates the intermediate transfer belt 41 with the third irradiation light Ra3. The diameter d4, which is formed when the third irradiation light Ra3 arrives at the light receiving unit 82, is less than the diameter d3 which is formed when the light is incident onto the second incident surface A2. As a result, the reflection light Ra4, which is substantially annular, and the third irradiation light Ra3, which is concentrated inside the reflection light Ra4, arrive at the light receiving unit 82.

As described above, in the third exemplary embodiment, in the light receiving unit 82, the reflection light Ra4, which is specularly reflected by the intermediate transfer belt 41, is changed into the reflection light Ra4, which is substantially annular, and the third irradiation light Ra3 which is concentrated inside the reflection light Ra4, whereby the profile of the light received by the light receiving unit 82 is approximate to, for example, the projected light profile F1 shown in FIG. 4. Consequently, the accuracy in the position and the density detected by the detection unit 18 is improved.

4. Modified Examples

The exemplary embodiments are hitherto described, but the contents of the exemplary embodiments may be modified as follows. Further, the following modified examples may be combined.

4-1. Modified Example 1

In the above-mentioned exemplary embodiments, the developing unit 13 uses the four kinds of toners of yellow, magenta, cyan, and black, but may use, for example, only the black toner. In this case, the developing unit 13 may be single.

4-2. Modified Example 2

In the above-mentioned exemplary embodiments, the detection unit 18 specifies the density deviation amount or the positional deviation amount on the basis of the received light by irradiating the density reference image or the position reference image, which is formed on the intermediate transfer belt 41, with light, and receiving the reflection light. However, the received reflection light is not limited to the reflection light which is reflected from the transfer medium referred to as the intermediate transfer belt 41. For example, the detection unit 18 may specify the density deviation amount or the positional deviation amount on the sheet of paper P by irradiating the density reference image or the position reference image, which is formed on the moving sheet of paper P, with light, and receiving the reflection light.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an irradiation unit that irradiates a medium with first irradiation light;
   a first optical system that comprises a first incident surface and a first refractance surface, wherein the first incident surface is substantially annular and onto which a first part of the first irradiation light is incident, wherein the first refractance surface changes the first part of the first irradiation light, which is incident from the corresponding first incident surface, into second irradiation light of which a first diameter formed when the light arrives at the medium is less than or equal to a second diameter formed when the light is incident onto the first incident surface;
   a second optical system that comprises a second incident surface and a second refractance surface that is separate from the first refractance surface and is within the first optical system, wherein the second incident surface is surrounded by the first incident surface and onto which a second part of the first irradiation light is incident, the second part of the first irradiation light is different from the first part of the first irradiation light, wherein the second refractance surface changes the second part of the first irradiation light, which is incident from the corresponding second incident surface, into third irradiation light of which a third diameter formed when the light arrives at the medium is less than a fourth diameter formed when the light is incident onto the second incident surface, a center of the first diameter and a center of the third diameter being the same point;
   a light receiving unit that is provided in a traveling direction of reflection light of the second irradiation light and the third irradiation light, which are specularly reflected by the medium, and receives the reflection light of the second irradiation light and the third irradiation light, which are specularly reflected by the medium, so as to detect a positional deviation amount of an image formed on the medium and detect a density deviation amount of the image formed on the medium; and
   an image forming unit that forms an image on the medium, wherein the image forming unit adjusts a position of the image formed on the medium on the basis of the positional deviation amount which is detected by the light receiving unit, and adjusts the density of the image formed on the medium on the basis of the density deviation amount which is detected by the light receiving unit.

* * * * *